United States Patent [19]
Ward

[11] Patent Number: 5,485,416
[45] Date of Patent: Jan. 16, 1996

[54] COMPUTATIONAL CIRCUIT BASED ON CAPACITOR ARRAYS

[76] Inventor: Calvin B. Ward, 9580 Crow Canyon Rd., Castro Valley, Calif. 94546

[21] Appl. No.: 238,637

[22] Filed: May 5, 1994

[51] Int. Cl.$^6$ .................................................. G06G 7/02
[52] U.S. Cl. ............................................................. 364/825
[58] Field of Search ................................. 364/825–827, 364/819

[56] References Cited

U.S. PATENT DOCUMENTS

| | | | |
|---|---|---|---|
| 4,470,126 | 9/1984 | Haque et al. | 364/825 |
| 4,633,425 | 12/1986 | Senderowicz | 364/825 |
| 4,769,563 | 9/1988 | Holberg et al. | 364/825 X |
| 4,803,650 | 2/1989 | Nishimura et al. | 364/825 |
| 5,325,322 | 6/1994 | Bailey et al. | 365/825 |

*Primary Examiner*—Tan V. Mai

[57] ABSTRACT

A circuit for generating a signal indicative of the result of the computation $$F = \sum_{i=0}^{N-1} a_i S_i.$$

The circuit includes a plurality of signal input lines, for receiving voltages proportional to $S_i$. The summation is performed on a first charge integration circuit having an input terminal and elements for generating an output signal indicative of the total charge received on the input terminal. The input terminal is held at a reference potential independent of the charge input thereto. The weight signals values are generated on a first capacitor network includes a plurality of capacitors, each capacitor having a top electrode and a bottom electrode. Each top electrode is connected to one of the signal input lines and each bottom electrode is connected to the input terminal of the first charge integration circuit. The capacitor connected to the signal line corresponding to $S_i$ has a capacitance proportional to $a_i$ if $a_i \geq 0$. If any of the $a_i$ values is negative, a second charge integration circuit and a second capacitor network is included in the circuit. The second charge integration circuit also has an input terminal and circuitry for generating an output signal indicative of the total charge received on the input terminal. The input terminal of the second charge integration circuit is also held at the reference potential independent of the charge input thereto. The second capacitor network also includes a plurality of capacitors, each capacitor having a top electrode and a bottom electrode. Each top electrode is connected to one of the signal lines and each bottom electrode is connected to the input terminal of the second charge integration circuit. In the case in which one of the $a_i \geq 0$, the capacitances are chosen such that the difference in the capacitance values of the capacitor in said first capacitor network and said capacitor in said second capacitor network connected to the signal line corresponding to $S_i$ is proportional to $a_i$. A difference circuit generates a signal indicative of the difference in the output signals generated by the first and second charge integration circuits to provide the value F.

6 Claims, 4 Drawing Sheets

COMPUTATIONAL CIRCUIT BASED ON CAPACITOR ARRAYS

FIELD OF THE INVENTION

The present invention relates to analog computational circuits, and more particularly, to an analog circuit for computing the convolution of one or more sequences of weights with a signal vector.

BACKGROUND OF THE INVENTION

There are a large number of computations that involve the calculation of a quantity of the form $$^kF = \sum_{i=0}^{N-1} {}^ka_i S_i \qquad (1)$$

where the values $S_i$ are a sequence of signal values, and the parameters ${}^k a_i$ are a set of weights. The value of k will vary with the particular computation. For example, a bank of finite impulse response filters (FIRs) performs a set of computation of the form shown in Eq.(1). If there are K filters in the bank, k runs from 1 to K. The output, ${}^kF$, is related to the intensity of the signal S in each of the $k^{th}$ frequency band. A discrete Fourier transform may also be performed in this manner.

A number of signal processing applications involve sub-band sampling an input signal. For example, image compression systems often start by generating a number of component images that differ in their spatial resolution and spatial frequency content. The sub-band sampling operation may be written in the form shown in Eq (1).

Yet another example of an important problem that may be written in terms of computations of the form shown in FIG. 1 is that of construction "neuro-networks". One class of neuro-networks may be viewed as being constructed from a sequence of ordered layers of "neurons". Each neuron receives N signals form the previous layer and generates an output signal which is related to a convolution of the form shown in Eq. (1). The task of "training" the neuro-network is equivalent to determining the values for the weights ${}^ka_i$.

In many of these problems, the computational cost is dominated by the cost of performing the calculation shown in Eq. (1). Hence, a number of special purpose digital processors have been designed to improve the computation shown in Eq. (1). While these processors have reduced the cost of performing such computations, the processors are either too slow or too expensive for many applications.

Neuro-networks provide relatively high speed in performing these types of computations because the operation is performed in parallel. Unfortunately, neuro-networks use either resistors or EEPROM cells to store the weights ${}^k a_i$. The cost of integrated circuits is directly related to the area of silicon that must be utilized in constructing the circuit. Resistors are difficult to implement in small areas. Similarly, EEPROM cells require a significant area to implement. In this regard, it should be noted that neuro-networks for problems such as handwriting analysis may require in excess of 100,000 resistors.

Resistors and EEPROM also lack the accuracy needed for many convolution computations. The accuracy with which the resistance presented by an EEPROM cell may be programmed is a few percent at best. Similarly, the accuracy with which resistors can be constructed is determined by the accuracy of lithography and trimming operations. To provide high accuracy, requires large area devices which increases the expense of such devices.

Broadly, it is the object of the present invention to provide an improved computational circuit for performing convolution computations.

It is a further object of the present invention to provide a neuro-network design that does not depend on arrays of resistors or EEPROM cells.

These and other objects of the present invention will become apparent to those skilled in the art from the following detailed description of the invention and the accompanying drawings.

SUMMARY OF THE INVENTION

The present invention is a circuit for generating a signal indicative of the result of the computation $$F = \sum_{i=0}^{N-1} a_i S_i.$$

The circuit includes a plurality, of signal input lines, each signal line receiving a voltage proportional to a different one of the signal values $S_i$. The summation is performed on a first charge integration circuit having an input terminal and elements for generating an output signal indicative of the total charge received on the input terminal. The input terminal being held at a reference potential independent of the charge input thereto. The weight signals values are generated on a first capacitor network comprising a plurality, of capacitors, each capacitor having a top electrode and a bottom electrode. Each top electrode is connected to one of the signal input lines and each bottom electrode is connected to the input terminal of the first charge integration circuit. The capacitor connected to the signal line corresponding to $S_i$ has a capacitance proportional to $a_i$ if $a_i \geq 0$. If any of the $a_i$ values is negative, a second charge integration circuit and a second capacitor network is included in the circuit. The second charge integration circuit also has an input terminal and means for generating an output signal indicative of the total charge received on the input terminal. The input terminal of the second charge integration circuit is also held at the reference potential independent of the charge input thereto. The second capacitor network also includes a plurality of capacitors, each capacitor having a top electrode and a bottom electrode. Each top electrode is connected to one of the signal lines and each bottom electrode is connected to the input terminal of the second charge integration circuit. In the case in which one of the $a_i < 0$, the capacitances are chosen such that the difference in the capacitance values of the capacitor in said first capacitor network and said capacitor in said second capacitor network connected to the signal line corresponding to $S_i$ is proportional to $a_i$. A difference circuit generates a signal indicative of the difference in the output signals generated by the first and second charge integration circuits to provide the value F.

DETAILED DESCRIPTION OF THE INVENTION

Figure 1:
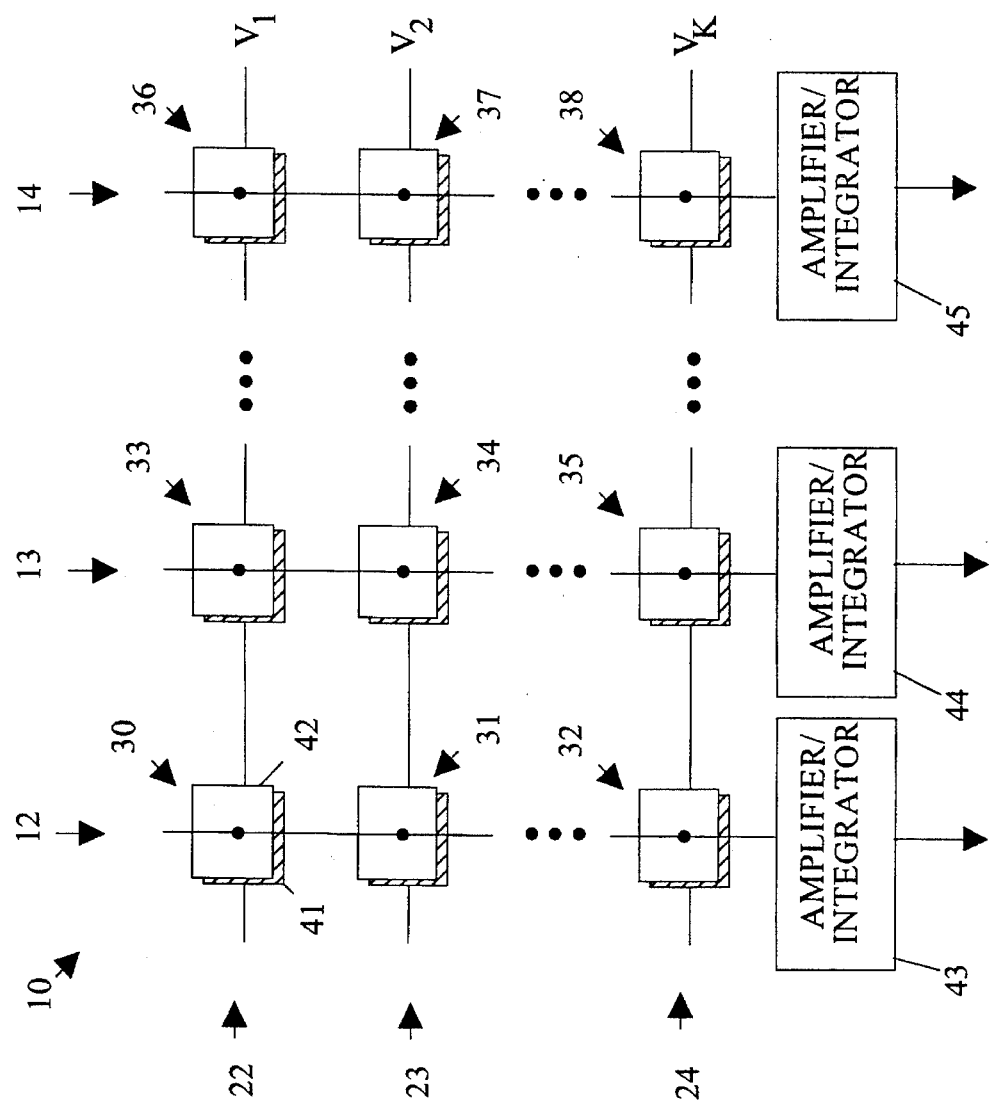
FIG. 1 is a block diagram of one embodiment of a computational circuit according to the present invention.

The present invention is based on a two-dimensional array of capacitors that is organized as a cross-point array. A computational circuit according to the present invention is shown in FIG. 1 at 10. Circuit 10 includes a capacitor array comprising a plurality of capacitors having top and bottom plates. Exemplary capacitors are shown at 30–38. The top plates are connected to form a plurality of columns of which columns 12–14 are exemplary, and the bottom plates are connected to form a plurality of rows of which rows 22–24 are exemplary. In the preferred embodiment of the present invention, each capacitor is used to store one weight value. The result of a convolution computation is presented as a charge displaced from the capacitors on one of the columns when voltages representative of the signal values $S_i$ are placed on each of the rows. Each column includes an amplifier/integrator circuit for this purpose. Exemplary amplifier/integrator circuits are shown at 43–45.

Consider the charge displaced from one of the columns when the row connections are connected to a voltage source. In general, the charge, Q, displaced from a capacitor when a potential difference of V is applied across the capacitor is given by Q=CV, where C is the capacitance and V the applied potential. Suppose each of the rows is connected to a different voltage, the $i^{th}$ row being connected to $V_i$. Then the charge displaced from the $k^{th}$ column is given by $$Q_k = \sum_{i=0}^{N-1} C_{i,k} V_i \quad (2)$$

where $C_{i,k}$ is the capacitance of the capacitor connecting the $i^{th}$ row to the $j^{th}$ column. If Eq. (2) is compared to Eq.(1), it will be apparent that the charge displaced on the $j^{th}$ column will be proportional to signal $^k F$ if $C_{i,k}$ is proportional to $^k a_i$. Hence, if one measures the charge displaced from the columns when signal voltages proportional to the signal, $S_i$, are applied, a convolution computation may be performed.

Consider a single column, the $j^{th}$ column, of a capacitor cross-point array such as shown in FIG. 1. When a signal is applied to the $i^{th}$ row of the array, the displaced charge must either be stored on one of the other capacitors in the $j^{th}$ column or exit via charge amplifier 105. If the potential difference between the two inputs to operational amplifier/integrator. If the potential at the input to the charge amplifier is maintained at zero, no charge can be stored in any of the remaining capacitors in the row. Hence, the charge must exit via the amplifier/integrator. Amplifier/integrators of this type will be referred to as charge integrators in the following discussion.

The same result follows even if a potential is applied to each row, provided the potential at the input to the charge integrator at the end of the column is held at ground. In this case, each capacitor will have a potential difference determined by the signal applied to the row in which it is located. Since signal generators that drive the rows are assumed to be voltage sources that maintain each row line at the appropriate potential for the duration of the signal pulse. Since the potential difference across each capacitor in the column is fixed by the input potential to the charge integrator, the displaced charge cannot be stored on the capacitors. As a result, the signal from the charge integrator will be proportional to the sum of the displaced charges.

If every column is tied to ground via a connection to a charge amplifier, there can be no cross-talk between the columns. Hence, each column generates a signal which is the convolution of the signal values placed on the rows by the weight factors determined by the capacitors.

The manner in which the capacitance values are set will now be explained in more detail. As noted above, the capacitances $C_{i,k}$ are determined by the weight values used in the convolution. If the weight values are positive, the corresponding $C_{i,k}$ is set to a value proportional to the weight value. Unfortunately, many computations of interest involve negative weight values. For the purposes of the present discussion, it is sufficient to note that even with negative weight values, there is a corresponding capacitor whose capacitance is set by the absolute value of the weight value in question. The manner in which negative weight values are accommodated will be discussed in more detail below.

The capacitance of a capacitor is well known to be proportional to the area of its plates and the dielectric constant of the material between the plates and inversely proportional to the distance between the plates. In the preferred embodiment of the present invention, the capacitors are constructed with a ferro-electric dielectric to increase the capacitances. PZT compositions with dielectric constants of greater than 100 are well known to those skilled in the art, and hence, will not be discussed in more detail here.

Figure 2:
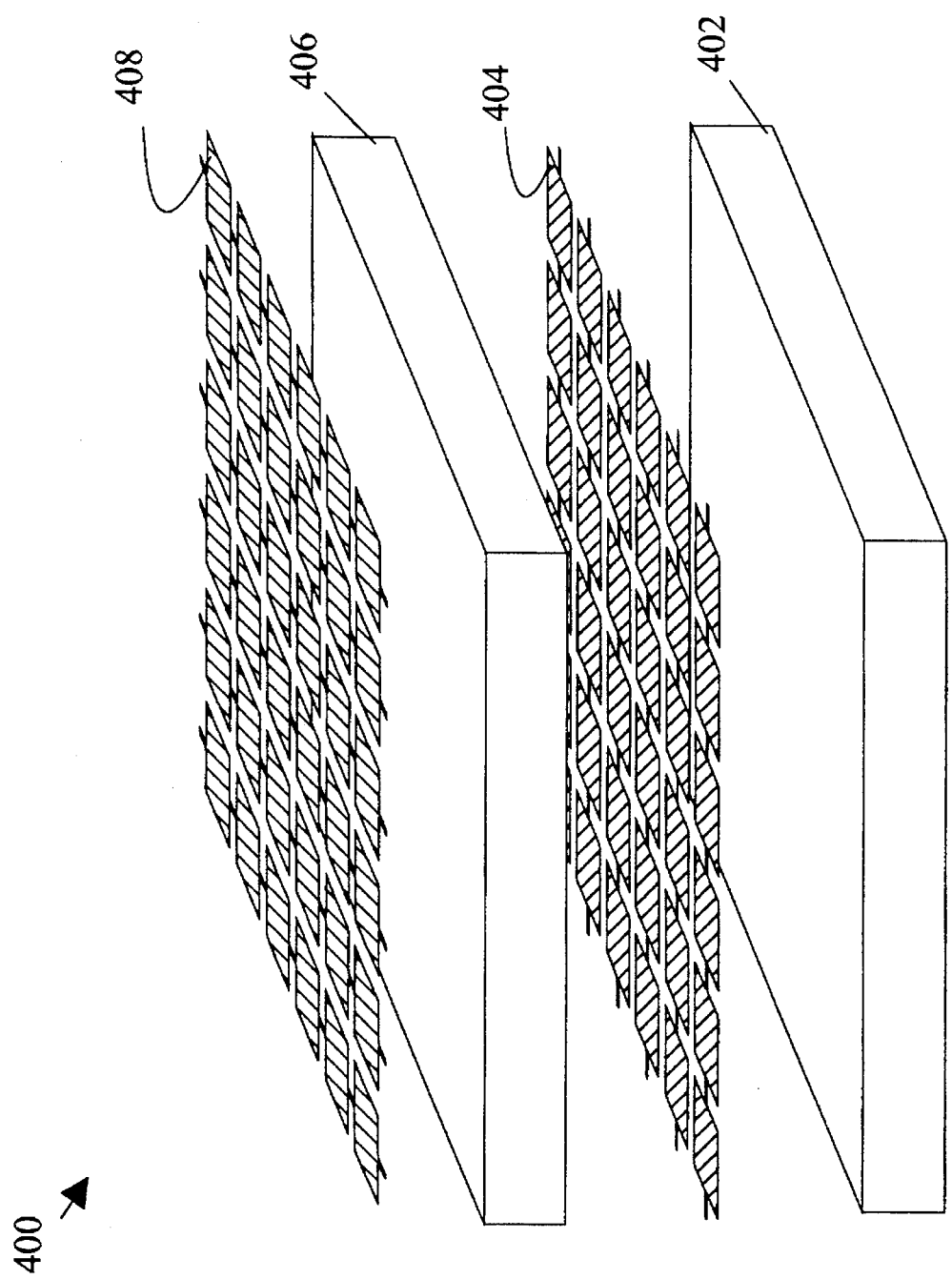
FIG. 2 illustrates the construction of a capacitor array according to the present invention.

In the preferred embodiment of the present invention, the capacitance values are set initially by setting the area of the capacitor plates. The resultant capacitances can then be adjusted by altering the dielectric constant of the material between the plates. The manner in which this is accomplished may be more easily understood with reference to FIG. 2 which illustrates the construction of a capacitor array 400 according to the present invention. Capacitor array 400 is preferably constructed on a substrate 402. If a silicon substrate is used, the amplifier/integrator circuitry may be fabricated on the same substrate by conventional integrated circuit fabrication techniques. The bottom electrodes of the capacitors are constructed on substrate 402 by depositing a platinum layer 404 which is patterned as connected rows of electrodes. The bottom electrodes 404 are preferably attached to substrate 402 with the aid of a $TiO_2$ "glue" layer which prevents separation of the bottom electrode layer from substrate 402 during later processing steps that involve substantial heating of substrate 402 and bottom electrode layer 404. The glue layer is generated by evaporating 150 Å of pure metallic titanium onto the substrate 402. The titanium layer is then annealed at 650° C for 0.5 hours to fully oxidize the titanium, thereby creating $TiO_2$. A 1000Å layer of platinum is then deposited on $TiO_2$ layer by evaporation. The platinum is annealed at 650° C. for 1 hour. The annealing step promotes adhesion between the metal oxide and the platinum. The platinum layer is then masked and etched with aqua regia to form bottom electrode layer 404.

A dielectric layer 406 is then deposited on bottom electrode layer 404. In the preferred embodiment of the present invention, dielectric layer is constructed from a ferroelectric material such as lead zirconate titanate (PZT). This material has a very high dielectric constant. The large dielectric constant increases the amount of charge available to the amplifier/integrators. In addition, the large dielectric constant can be reduced as described below to "trim" the capacitance.

The preferred method of deposition of the dielectric layer is the conventional sol gel deposition technique. In this technique, a solution of the PLZT material is spun onto the substrate to be coated. The solution consists of a solvent carrying a metal organic complex which has been partially gelled into long chains. The chains consist of a linear array of metal atoms alternating with oxygen atoms and coordinated with hydrocarbon groups along the outside of the linear array. The chains are normally formed by hydrolysis of alkoxides which are individual metal atoms bonded to the hydrocarbons. The alkoxides are mixed to produce the desired ratio of metal atoms in the final ceramic and then water is added to the mixture. The water hydrolyzes the individual alkoxide molecules into the chains which remain suspended in the solvent. In this way, metal oxide molecules are dissolved in solvents such as simple alcohols.

The sol gel is spun onto the substrate using a conventional spinning apparatus. The solvent evaporates during the spinning, leaving the surface of the substrate coated with metal organic chains. The substrate is then heated gradually to evaporate the remaining solvent. After the solvent has been evaporated, the coated substrate is heated further to break the hydrocarbon bonds. As a result, hydrogen, carbon and oxygen are released, leaving a coming of metals and oxygen. The substrate is then raised to a temperature which sinters the amorphous layer into its ceramic form. For PZT, the hydrocarbons evaporate below 400 ° C.

While the present invention preferably uses sol gel for the deposition of the dielectric layer, it will be apparent to those skilled in the art that other methods of depositing a PZT film may be utilized. For example, such films may be deposited using CVD or PECVD.

Finally, a metallic layer 408 comprising the top electrodes of the capacitors is deposited on dielectric layer 406. The capacitors in this layer are patterned as connected columns of electrodes. The electrodes are preferably constructed from platinum for compatibility with the PZT material.

If the weight values are known at the time of fabrication of the array, the bottom and top electrode areas can be adjusted to correspond to the known weight values. This procedure requires separate masks for the top and bottom electrodes for each configuration. It is often advantageous to be able to make one of a kind arrays. This can be accomplished by patterning the top and bottom electrodes to be all of the same size, the maximum size. The resultant part may be made in quantity and stored until needed. The array is then programmed by removing a portion of each of the top plates. The plate material may be removed by laser trimming or by lithography if the volume justifies constructing a mask.

The precision with which the capacitance can be adjusted by adjusting the plate area is limited by the accuracy with which laser trimming or the like can be performed. In general, lithographic techniques with accuracies less than a micron are expensive to utilize. Hence, the capacitor areas must be made quite large if high precision is to be obtained solely by trimming the capacitor plate area.

To provide higher precision in setting the capacitance values, the preferred embodiment of the present invention utilizes a combination of plate trimming and dielectric constant adjustment. To set the desired capacitance, the plate area is first adjusted to be just slightly greater than that needed to produce the exact capacitance value. The dielectric constant over a portion of the capacitor is then reduced to provide the exact capacitance needed. In this regard, it should be noted that the capacitors may be connected to an appropriate test circuit during the trimming operation so as to measure the capacitance during trimming.

As noted above, the preferred embodiment of the present invention utilizes a PZT dielectric material. In the persokvite phase, PZT can provide dielectric constants as high as 1000. However, if this phase is destroyed, the resulting dielectric constant is less than 50. It should be noted that the destruction of the persokvite phase may be accomplished in a gradual manner over a limited area of the capacitor. The persokvite phase may be destroyed by localized heating or by ion bombardment. Consider a capacitor that is (100 µm)×(100 µm) in area. With a 1 µm diameter laser spot, the area of the top plate can be trimmed to an accuracy of one part in $10^4$. Assume that an ion beam can be directed at any (1 µm)×(1 µm) spot on the capacitor. The capacitor can be regarded as $10^4$ small capacitors of this size connected in parallel. The dielectric constant of any of these small capacitors may be changed to be any value between the initial value of 1000 and 50, the exact value being determined by bombardment dose. The bombardment dose can be controlled to an accuracy of at least 1 part in 100. Hence, one can set the capacitance value to an accuracy of one part in $10^6$.

While the present invention may be constructed on a conventional semiconductor substrate such as silicon, it is worth noting that the capacitor array may be constructed on non-silicon substrates, thereby reducing the cost of manufacture. The only integrated circuit components needed in the present invention are connected to either the row or column lines at the edges of the capacitor array. These components may be added after fabrication of the array.

As noted above, the above analysis assumed that the weight factors were all positive. For most problems of interest, however, the weight factors in the convolution calculation are both positive and negative. To accommodate negative weight factors, a modified version of the capacitor array shown in FIG. 1 is utilized. In the preferred embodiment of the present invention, each column discussed above is replaced by two columns, one for summing the products involving positive weights and one for summing the products involving negative weights. The results of the two summations are then combined to arrive at the final convolution value.

Figure 3:
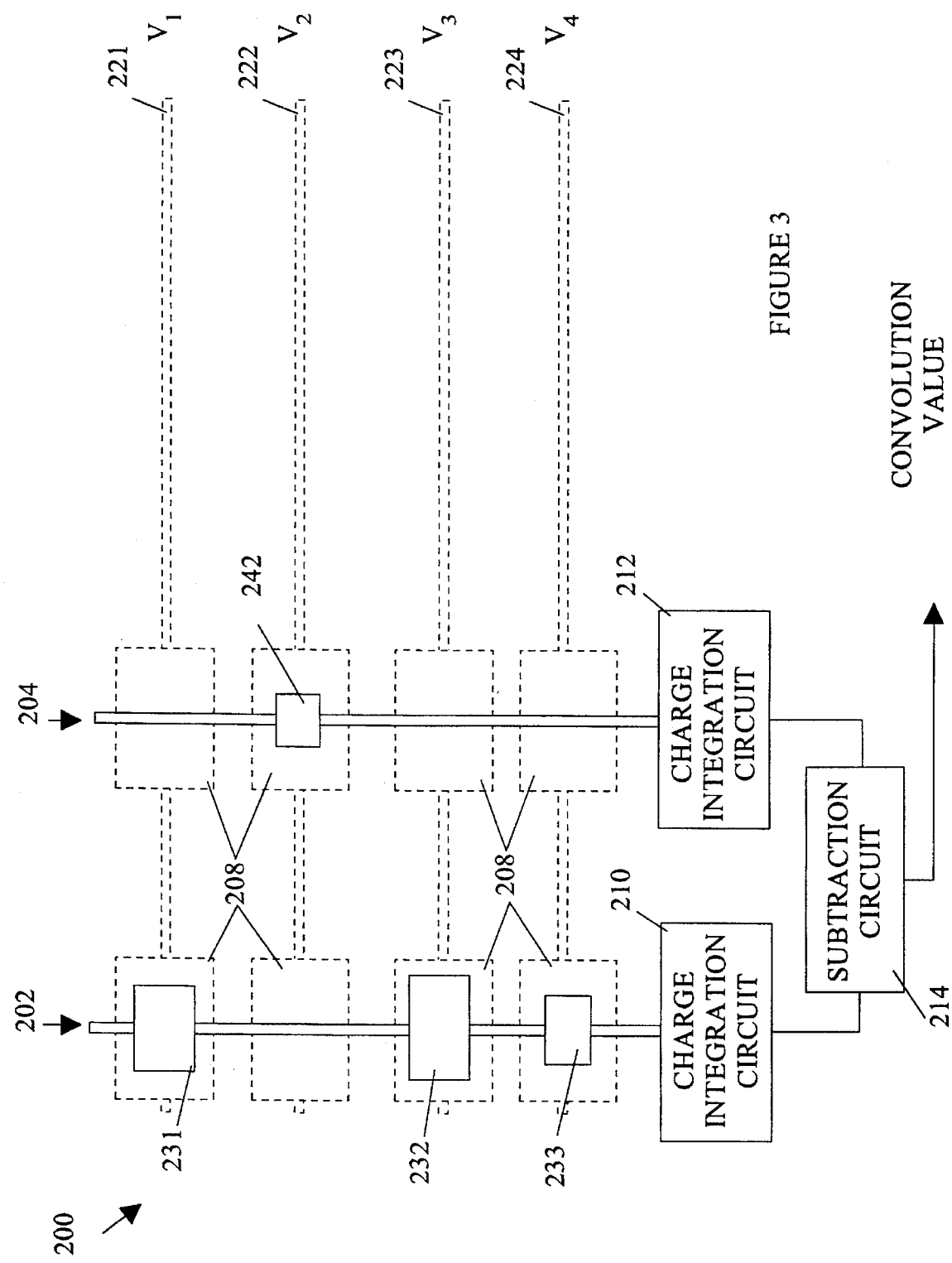
FIG. 3 is a block diagram of a computational circuit according to the present invention which allows negative weight factors.

Refer now to FIG. 3 which is a top view of an array 200 according to the present invention for computing a single convolution involving 4 weight factors applied to 4 signal values. Array 200 computes the convolution of four weights with 4 corresponding signal values. The signal values are applied to row conductors 221–. 224. The bottom plates of the capacitors 208 are shown in phantom in FIG. 3. As shown in FIG. 3, the bottom plates are all the same size. The bottom plates are connected to the corresponding row conductors. The top plates of the capacitors are organized into two columns 202 and 204. The top plates 231–233 corresponding to positive weights are in column 202, and the top plates corresponding to negative weights are in column 204. In the example shown in FIG. 3 there is only one top plate 242 corresponding to a negative weight. In the ideal case in which the capacitance generated by a bare column conductor over a bottom plate is zero, the area of the top plates is set to be proportional to the weight coefficient in the convolution computation. If the capacitance in not negligible, then the area of the top plates in any given row is set such that the difference in capacitance generated by the two top plates is proportional to the weight factor. For example, if the two capacitors connected to row 222 correspond to a weight factor A, then the area of top plate 242 is set such that A is proportional to $C_2$–$C_1$, where $C_2$ is the capacitive coupling between conductors 222 and 202, and $C_1$ is the capacitive coupling between conductors 222 and 204.

The charge driven off of the capacitors in each column when the signals are applied to row conductors 221–224 is measured by charge integration circuits 210 and 212. A difference circuit 214 computes the difference of the charge collected from the two rows. The resulting signal is proportional to $$S = \sum_{i=1}^{4} (C_i - C'_i) * V_i \quad (3)$$

Where $C_i$ for i=1 to 4 is the capacitive coupling between conductors 221–224 and conductor 202, respectively, and $C'_i$ for i=1 to 4 is the capacitive coupling between conductors 221–224 and conductor 204, respectively. Hence, if $C_i$–$C'_i$ is proportional to the absolute value of the corresponding weight factor, circuit 200 computes the desired convolution.

The above-described embodiments of the present invention assume that the signal values $V_i$ are non-negative, or at least, the net charge reaching each of the column charge integrators is non-negative. This assumption is needed if simple operational amplifier based charge amplifiers are to be used. If negative signal values are present, either the charge amplifiers must be capable of operating on negative signals or the signals actually applied to the row conductors must be modified. In the later case, a constant potential can be added to each signal. The constant is sufficient to cause all of the signals to be positive. The resulting convolution values must then be corrected for this constant signal. Such correction is easily computed by observing the output of the array when only the correction signal is present.

The above-described embodiments of the present invention assumed that the signal values $V_i$ were all present at the same time. This is typically the case in applications such as neuro-networks. In the case of signal processing, the $V_i$ are the successive values in time of a signal. Hence, the $V_i$ are not necessarily all present at the same time. This situation can be accommodated by incorporating sample and hold circuits in each row. As each time sample arrives, it is stored on a corresponding row by charging the row line to the appropriate voltage using the sample and hold for that row. The charge corresponding to the products of the signal and the various weights will be driven off the capacitors and into the charge integrators at the end of each of the rows. When the last row has been charged, the output of the integrators should be the desired convolution value.

Figure 4:
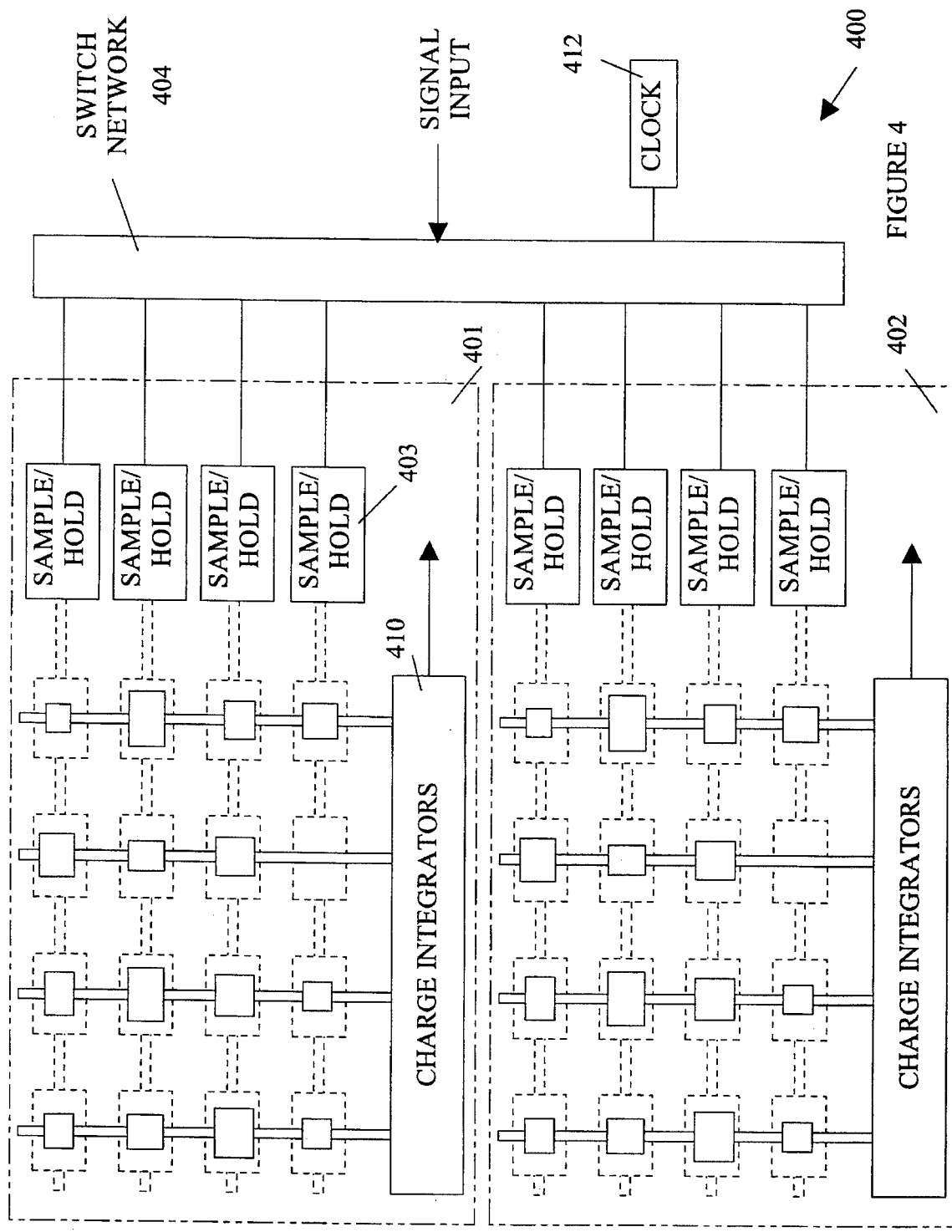
FIG. 4 is a block diagram of computational circuit according to the present invention which may be used as a filter bank for filtering a signal that changes over time.

Refer now to FIG. 4 which is block diagram of an embodiment of the present invention which utilizes sample and hold circuits as well as multiple capacitor arrays perform filtering operations on a signal consisting of a voltage that varies with time. It is assumed that the signal values in a window in time are filtered to provide the signal amplitude in each of 4 frequency bands by convolving each set of successive 4 signal values with 4 sets of weights. Two capacitor arrays, 401 and 402, are used in the filtering operation. The first array 401 computes the value of the first set of 4 signal values. The second array 402 computes the frequency amplitudes for the next set of four values. The third set of four signal values is then input to the first array 401, and so on. The use of two alternating arrays allows the first array sufficient time for the charge integrators 410 to settle before being read out even if the inter-sample time spacing is less than the settling time of the charge integrator. A switch network 404 is used to connect the input signal to each of the samples and hold circuits in succession. A typical sample and hold is shown at 403. If the successive time windows do not overlap in time, switch network 404 is essentially a commutator that connects the input signal to each sample and hold circuit in succession. The commutation among the sample and hold circuits may be controlled by a clock 412.

There are filtering applications in which the successive windows in time overlap. In such systems, the multiple capacitor array configuration shown in FIG. 4 provides a means for processing the overlapping windows. Consider the case in which the windows overlap by two time samples. Denote the input signal values by $S_i$, for i=1,2, ... Then the first window would consist of samples $S_1$ through $S_4$. These samples would be applied to capacitor array 401. The second window would consist of samples $S_3$ through $S_6$. These samples would be applied to capacitor array 402. The third set would be samples $S_5$ through $S_8$ and would be applied to capacitor array 401, and so on. In the case of two overlapping windows, switch network applies each input signal value to two of the inputs, one in capacitor array 401 and one in capacitor array 402. For example, $S_3$ would be applied to the third input of capacitor array 401 and the first input of capacitor array 402 in the above example. Capacitor array 401 is readout after all four of its signal values have been received. In this case, the settling time of the charge integrators must be less than the inter-sample time, since both capacitor arrays are needed just to process the overlapping windows. If the charge integrators are not sufficiently fast, additional capacitor arrays may be utilized.

Various modifications to the present invention will become apparent to those skilled in the art from the foregoing description and accompanying drawings. Accordingly, the present invention is to be limited solely by the scope of the following claims.

What is claimed is:

1. A circuit for generating a signal indicative of the result of the computation $$F = \sum_{i=0}^{N-1} a_i S_i,$$

wherein said $a_i$ are fixed weights, said circuit comprising:
 a plurality of signal input lines, each said signal line receiving a voltage proportional to a different one of said signal values $S_i$;
 a first charge integration circuit having an input terminal and means for generating an output signal indicative of the total charge received on said input terminal, said input terminal being held at a reference potential independent of the charge input thereto, said output signal determining said value F if all of said $a_i$ are non-negative; and
 a first capacitor network comprising a plurality of capacitors, each said capacitor having a top electrode and a bottom electrode, each said top electrode being connected to one of said signal input lines and each said bottom electrode being connected to said input terminal of said first charge integration circuit, wherein said capacitor connected to said signal line corresponding to $S_i$ has a capacitance proportional to $a_i$.

2. The circuit of claim 1 further comprising:
 a second charge integration circuit having an input terminal and means for generating an output signal indicative of the total charge received on said input terminal, said input terminal being held at said reference potential independent of the charge input thereto;
 a second capacitor network comprising a plurality of capacitors, each said capacitor having a top electrode and a bottom electrode, each said top electrode being connected to one of said signal lines and each said bottom electrode being connected to said input terminal of said second charge integration circuit, wherein there is one capacitor from said first capacitor network and one capacitor from said second capacitor network connected to each said signal line and wherein the difference of the capacitance values of said capacitors connected to said signal line corresponding to $S_i$ is proportional to $a_i$; and a difference circuit for generating a signal indicative of the difference in said output signals generated by said first a second charge integration circuits, said signal indicative of said difference determining said value F.

3. The circuit of claim 1 further comprising a plurality of sample and hold circuits, there being one said sample and hold circuit connected to each said signal input lines.

4. The circuit of claim 3 further comprising:

input means for receiving said input signal values on an input terminal; and routing means for connecting said input terminal to each of said sample and hold circuits.

5. The circuit of claim 1 wherein all of said bottom electrodes have the same surface area and at least two of said top electrodes have different surface areas.

6. The circuit of claim 1 wherein at least one of said capacitors further comprises a dielectric layer and wherein said dielectric layer has first and second regions, said first region having a different dielectric constant than said second region.

* * * * *